United States Patent
White et al.

(10) Patent No.: US 8,160,557 B2
(45) Date of Patent: Apr. 17, 2012

(54) INTEGRATION OF WIRELESS AND EXTERNAL COMPUTING DEVICES

(75) Inventors: Christopher A. White, Redmond, WA (US); Russell J. Waughman, Woodinville, WA (US); Gregg J. Berretta, Bellevue, WA (US)

(73) Assignee: AT&T Mobility I LLC, Atlanta, GA (US)

( * ) Notice: Subject to any disclaimer, the term of this patent is extended or adjusted under 35 U.S.C. 154(b) by 0 days.

(21) Appl. No.: 10/662,639

(22) Filed: Sep. 15, 2003

(65) Prior Publication Data
US 2005/0059439 A1    Mar. 17, 2005

(51) Int. Cl.
*H04M 3/42* (2006.01)
(52) U.S. Cl. ..... 455/415; 455/557; 455/566; 455/158.4; 379/88.2; 379/93.03; 379/127.06; 379/207.13; 379/245
(58) Field of Classification Search ............ 455/415, 455/577, 566, 158.4; 379/88.2, 245, 88.19, 379/88.21, 93.03, 127.06, 207.13, 8, 8.2, 379/207.15
See application file for complete search history.

(56) References Cited

U.S. PATENT DOCUMENTS

| | | | |
|---|---|---|---|
| 5,903,833 A | 5/1999 | Jonsson et al. | |
| 6,314,302 B1 | 11/2001 | Haferbeck et al. | |
| 6,327,342 B1 * | 12/2001 | Mobley et al. | 379/45 |
| 6,385,305 B1 * | 5/2002 | Gerszberg et al. | 379/88.13 |
| 6,492,993 B1 | 12/2002 | Livesey et al. | |
| 6,574,468 B1 * | 6/2003 | Tanaka | 455/415 |
| 6,668,049 B1 * | 12/2003 | Koch et al. | 379/211.02 |
| 6,693,897 B1 * | 2/2004 | Huang | 370/352 |
| 6,823,048 B2 * | 11/2004 | Gillespie | 379/88.19 |
| 6,868,268 B2 * | 3/2005 | Worsham et al. | 455/415 |
| 6,888,927 B1 * | 5/2005 | Cruickshank et al. | 379/88.11 |
| 6,993,119 B1 * | 1/2006 | Zhang et al. | 379/88.01 |
| 7,174,163 B2 * | 2/2007 | Aksu et al. | 455/414.1 |
| 7,359,697 B2 * | 4/2008 | Toraguchi et al. | 455/415 |
| 2003/0133543 A1 * | 7/2003 | Khakoo et al. | 379/88.22 |
| 2003/0134626 A1 * | 7/2003 | Himmel et al. | 455/419 |
| 2005/0207550 A1 * | 9/2005 | White et al. | 379/142.01 |

FOREIGN PATENT DOCUMENTS

JP    405336262 A   * 12/1993

* cited by examiner

*Primary Examiner* — Nghi Ly
(74) *Attorney, Agent, or Firm* — Moazzam & Associates, LLC

(57) ABSTRACT

Information is received from a caller via a wireless device and communicated to an external computing device. Contact information for the caller is located using at least one of a name and phone number of the caller, and when the contact information for the caller is located, it is displayed on a display of the external computing device.

20 Claims, 12 Drawing Sheets

INTEGRATION OF WIRELESS AND EXTERNAL COMPUTING DEVICES

TECHNICAL FIELD

The present disclosure relates to the integration of wireless devices with external computing devices such as personal computers, laptop computers, handheld and palm computers, and so on.

BACKGROUND

Wireless telephones are popular, ubiquitous devices. It is now possible to make and receive phone calls from almost any place in the world. Communication is even possible from remote and undeveloped areas using wireless satellite telephones. Herein, the term wireless telephone refers to any device capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

Computing devices, such as desktop, laptop, automotive, and handheld computers, are common in both professional and private environments. Computing devices are often more capable than compact, portable wireless devices, comprising more processing power, more information storage capability, and more display and input/output capabilities. People often use such computing devices to store and manage personal and professional information. Increased integration between wireless devices and external computing devices (computing devices that are not part of the wireless devices) can exploit the greater capabilities of the external computing devices, and help make wireless devices more useful in the home and office.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

Information received from a caller via a wireless device is communicated to an external computing device. Contact information for the caller is located using at least one of a name and phone number of the caller. When the contact information for the caller is located, it is displayed by the external computing device. An email address may be located for the caller using at least one of a name and phone number of the caller and the email address may be applied to locate stored emails previously received from or sent to the caller. A new email message may be created and addressed to the caller. Scheduled activities involving the caller may be located. A new activity record involving the caller may be created when the call is rejected, the called party is busy, or there is no answer to the call. A URL of a web page associated with the caller may be located and the web page displayed using the external computing device. The caller's name may be applied to perform an Internet search and the results displayed using the external computing device.

The wireless device may include logic that enables the wireless device to interface with the external computing device, and rule logic to direct handling by the external computing device of call events of the wireless device.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

"Information" is configurations of matter representing knowledge, e.g. "data". Examples of information are collections of magnetic or optical bits.

Figure 1:
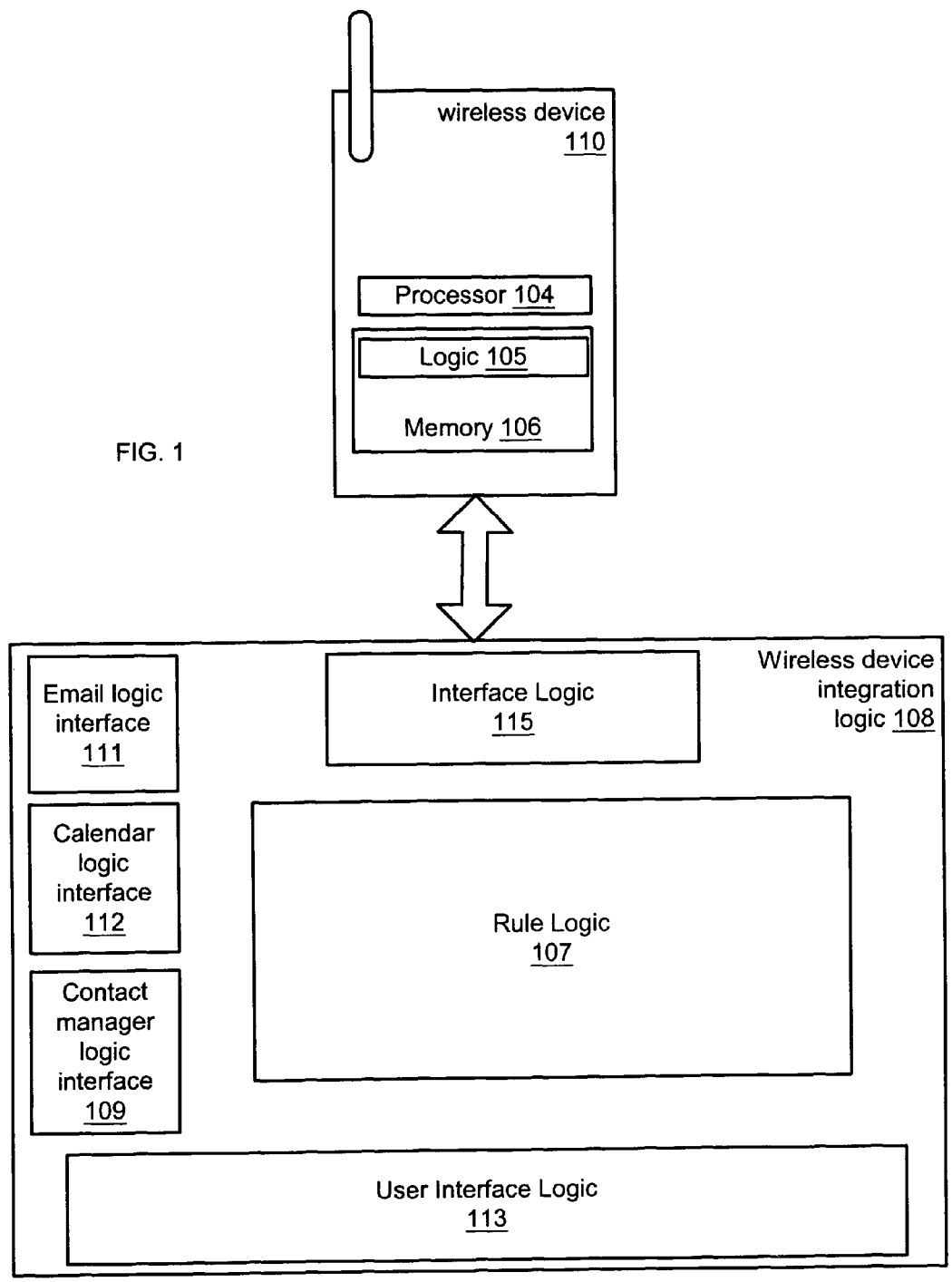
FIG. 1 is a block diagram of an embodiment of an arrangement integrating a wireless device with logic of an external computing device.

FIG. 1 is a block diagram of an embodiment of an arrangement integrating a wireless device with logic of an external computing device. A wireless device 110 comprises logic 105 and a processor 104 to execute the logic 105 to interface with logic 108 of an external computing device. A memory 106 may comprise some or all of the logic 105 of the wireless device 110.

The logic 108 of the external computing device comprises logic 115 to interface with the wireless device 110. The logic 108 of the external computing device further comprises rule logic 107 comprising rules for handling events and information received from the wireless device 110. For example, the rules logic 107 may comprise rules for processing an incoming call, for processing an incoming or outgoing Short Message Service (SMS) message, Enhanced Message Service (EMS) message, Multimedia Message Service (MMS) message, and for processing information such as a caller's identity, phone number, and location information, to name just some examples.

Configuration of the rules logic 107 may be effected by the user interface logic 113. The user interface logic 113 may accept signals from a person or other source. The user interface logic 113 may operate according to the signals to effect changes to the rules logic 107. For example, a person may signal to the user interface logic 113 to change the rules for handling incoming calls, and/or incoming calls from a particular caller.

The logic 108 comprises interface logic to various software applications of the external computing device. For example, the logic 108 may comprise email application interface logic 111, calendar application interface logic 112, and contact manager interface logic 109. Other examples of interface logic that might be present are browser application interface logic and instant messaging application interface logic.

Examples of email applications are Microsoft™ Outlook™ and Lotus™ Notes™. Examples of calendars are Microsoft Works™ Calendar and Act™ Calendar. Act™ is also an example of a contact manager application, also sometimes referred to as a personal information manager (PIM). Examples of browser applications are Netscape™ and Internet Explorer™. Examples of instant messaging logic are Yahoo™ Messenger™ and AOL™ Messenger™.

Figure 2:
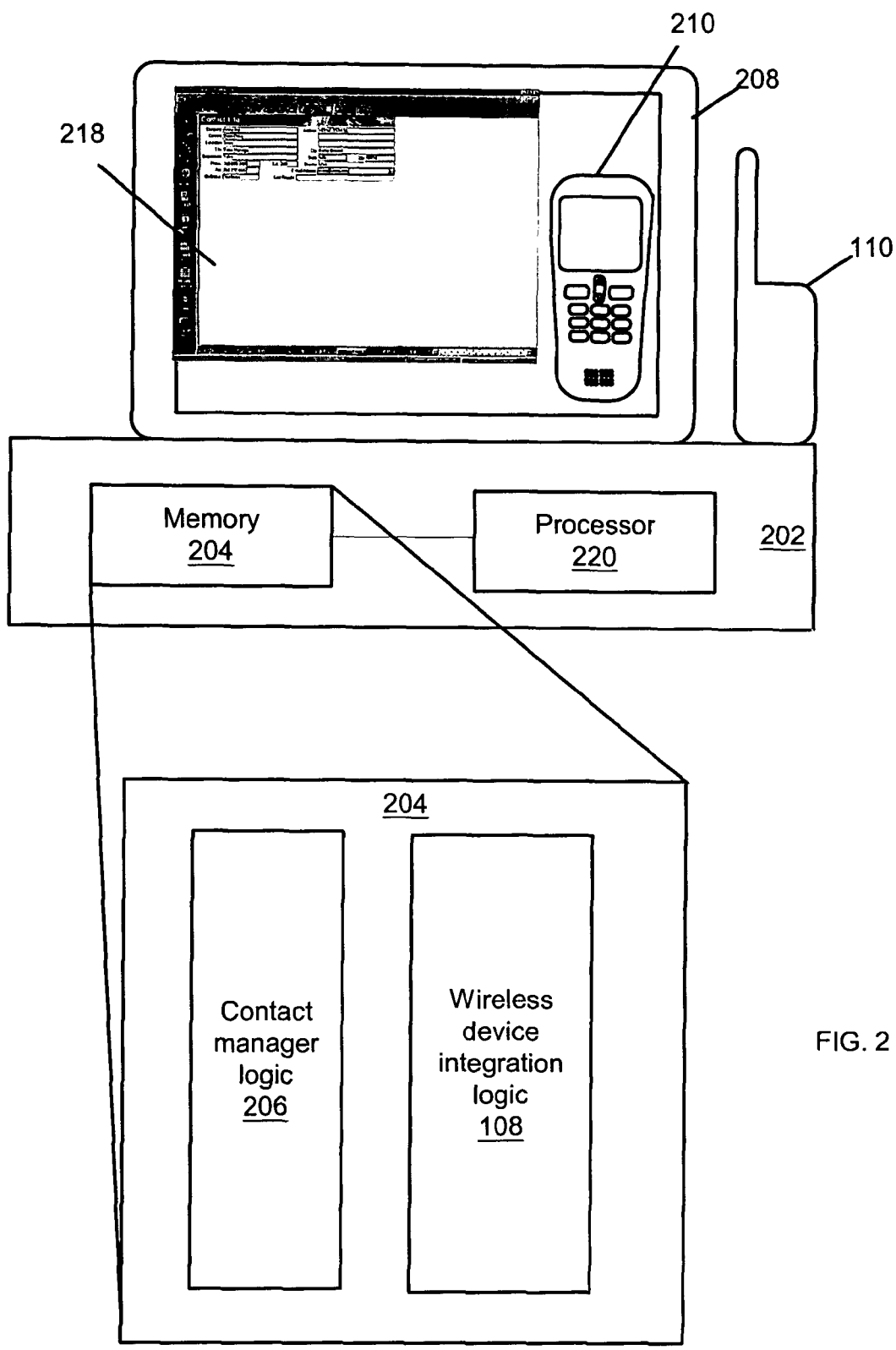
FIG. 2 is a block diagram of an embodiment of an arrangement integrating a wireless device with contact manager logic of a computing device.

FIG. 2 is a block diagram of an embodiment of an arrangement integrating a wireless device with contact manager logic of a computing device. The wireless device 110 may employ various techniques to communicate with the computing device 202, such as using a cable, docking station or port, and infra-red or other wireless technique such as Bluetooth, to name some examples. The computing device 202 comprises memory 204. Examples of memory include random-access memory (RAM), hard disks, CDROM memory, DVD memory, and flash memory. The memory 204, in turn, comprises various sets of logic which, when applied to a processor 220, affect the operation of the computing device 202. The logic comprised by the memory 204 includes the wireless device integration logic 108 and contact manager logic 206.

Applying the user interface logic 113 to the processor 220 results in display of a graphical user interface (GUI) 210 on a display 208 of the computing device 202. A user of the computing device 202 may interact with the GUI 210 to create signals to effect changes to the rules logic 107. For example, a user may interact with the GUI 210 to change the rules for handling incoming (communicated from the wireless device 110 to the computing device 202) and outgoing (communicated from the computing device 202 to the wireless device 110) SMS messages, Uniform Resource Locators (URLs), and/or duel tone multiple frequency (DTMF) signals.

Applying the contact manager logic 206 to the processor 220 results in display of a graphical user interface (GUI) 218. A user of the computing device 202 may interact with the GUI 218 to view and manage information about personal and professional contacts, such as the names, phone numbers, home and office addresses, and email addresses of family and business associates.

Figure 3:
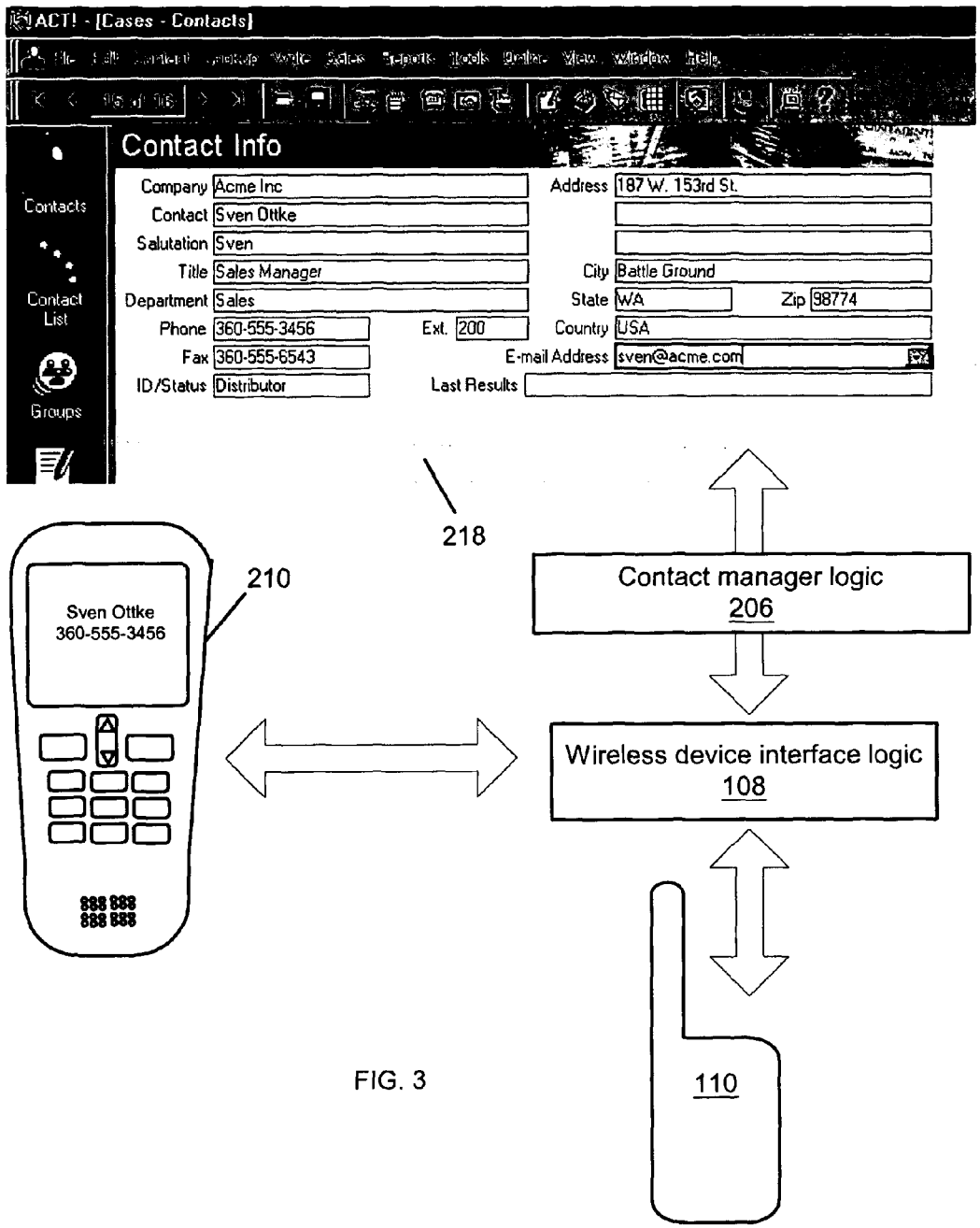
FIG. 3 is another block diagram of an embodiment of an arrangement integrating a wireless device with contact manager logic of a computing device.

FIG. 3 is another block diagram of an embodiment of an arrangement integrating a wireless device with contact manager logic of a computing device. Events and information from the wireless device 110 are communicated to the logic 108 of the external computing device. For example, an incoming call event and the phone number of a caller may be communicated from the wireless device 110 to the logic 108. The rules logic 107 determines how to process the received events and information.

The logic 108 may interact with the contact manager logic 206 to cause a lookup of the contact information associated with the caller's phone number. The contact information may include the caller's name, home and/or office address, email address, organizational information (department, title, position, supervisor, etc.), other phone numbers, and so on. The contact information may be stored by the computing device 202 or by a network (such as a corporate intranet or the Internet) to which the computing device 202 is coupled.

If a contact record is not found for the caller, the logic 108 may interact with the contact manager logic 206 to cause a new record for the caller to be created. Information about the caller made available from the wireless device (caller's phone number, name, photo, etc.) may be added to the newly created contact record.

The logic 108 may interact with the contact manager logic 206 to cause contact information associated with the called party or someone else—name, photo, etc.—to be communicated to the caller via the wireless device 110, for example, via SMS, EMS, or MMS.

The logic 108 may interact with the contact manager logic 206 and the GUI 210 to enable "drag-and-drop" of caller information displayed by the GUI 210 to the contact manager logic 206. "Dropping" the caller information (such as the caller's phone number and/or name) to the contact manager logic 206 may cause a lookup of the contact information associated with the caller's phone number, or create a new contact record for the caller. The logic 108 may interact with the contact manager logic 206 and the GUI 210 to enable "drag-and-drop" of contact information for the called party or someone else from the contact manager logic 206 to the GUI 210, resulting in communication of this information to the caller.

The logic 108 may interact with the contact manager logic 206 to cause contact information associated with the caller to be stored in the memory 106 of the wireless device 110. Contact information "dropped" from the contact manager logic 206 to the GUI 210 may be stored in the memory 106 of the wireless device 110.

Figure 4:
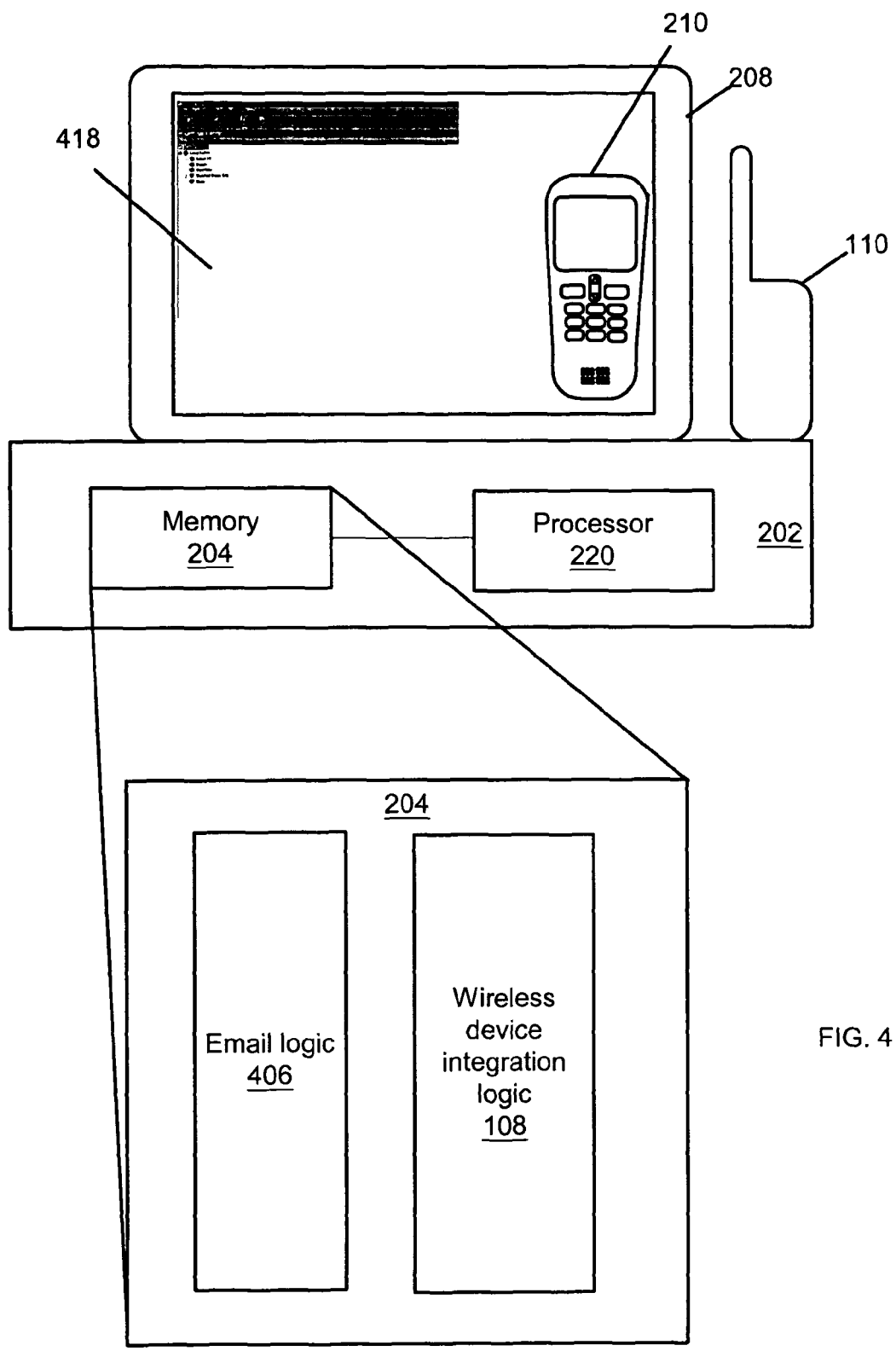
FIG. 4 is a block diagram of an embodiment of an arrangement integrating a wireless device with email logic of a computing device.

FIG. 4 is a block diagram of an embodiment of an arrangement integrating a wireless device with email logic of a computing device. The logic comprised by the memory 204 includes the wireless device integration logic 108 and email logic 406. Applying the email logic 406 to the processor 220 results in display of a graphical user interface (GUI) 418. A user of the computing device 202 may interact with the GUI 418 to read, write, send, manage, and organize email.

Figure 5:
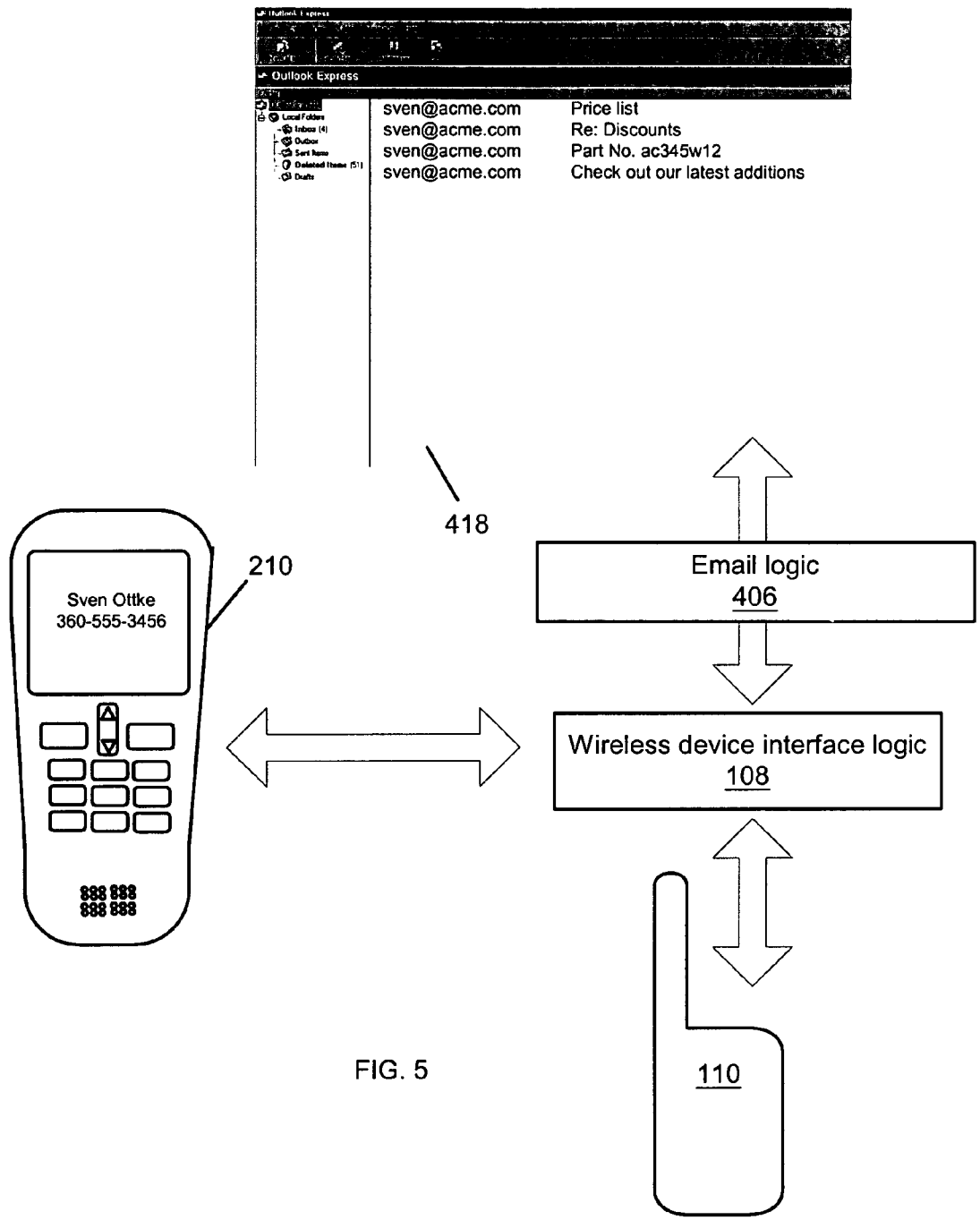
FIG. 5 is another block diagram of an embodiment of an arrangement integrating a wireless device with email logic of a computing device.

FIG. 5 is another block diagram of an embodiment of an arrangement integrating a wireless device with email logic of a computing device. The logic 108 may interact with the email logic 406 to identify the email address of the caller; to identify stored emails sent by and/or sent to the caller; and to highlight or otherwise call attention to the identified emails. If an email address is not found for the caller, the logic 108 may interact with the email logic 406 to cause a new address book record for the caller to be created. Information about the caller made available from the wireless device (caller's phone number, name, photo, etc.) may be added to the newly created address book record.

The logic 108 may interact with the email logic 406 to identify the email address of the caller; to cause creation of a new email message including the caller's email address in at least one of the "To", "Cc", and "Bcc" fields of the new email message; to identify information specific to the caller (e.g. vary the contents of the email according to who is calling—a customized response) and place such information in the body and/or attachments of the email message; and to communicate the email message to the email address associated with the caller. The email message may be formed to indicate that the wireless device is busy, or that there is no answer, or that the call has been rejected.

The logic 108 may interact with the email logic 406 to identify a phone number associated with an email address; to form an SMS, EMS, or MMS message from information from the body of an email message and/or attachments; and to wirelessly communicate the SMS, EMS, or MMS message over a connection to the phone number.

The logic 108 may interact with the email logic 406 and the GUI 210 to enable "drag-and-drop" of caller information displayed by the GUI 210 to the email logic 406. "Dropping" the caller information (such as the caller's phone number and/or name) to the email logic 406 may cause creation of a new email message including the caller's email address in at least one of the "To", "Cc", and "Bcc" fields of the new email message; to identify information specific to the caller and place such information in the body and/or attachments of the email message; and to communicate the email message to the email address associated with the caller.

The logic 108 may interact with the email logic 406 and the GUI 210 to enable "drag-and-drop" of a phone number and/or other information associated with an email address from the email logic 406 to the GUI 210. Information "dropped" from the email logic 406 to the GUI 210 may be stored in the memory 106 of the wireless device 110.

Figure 6:
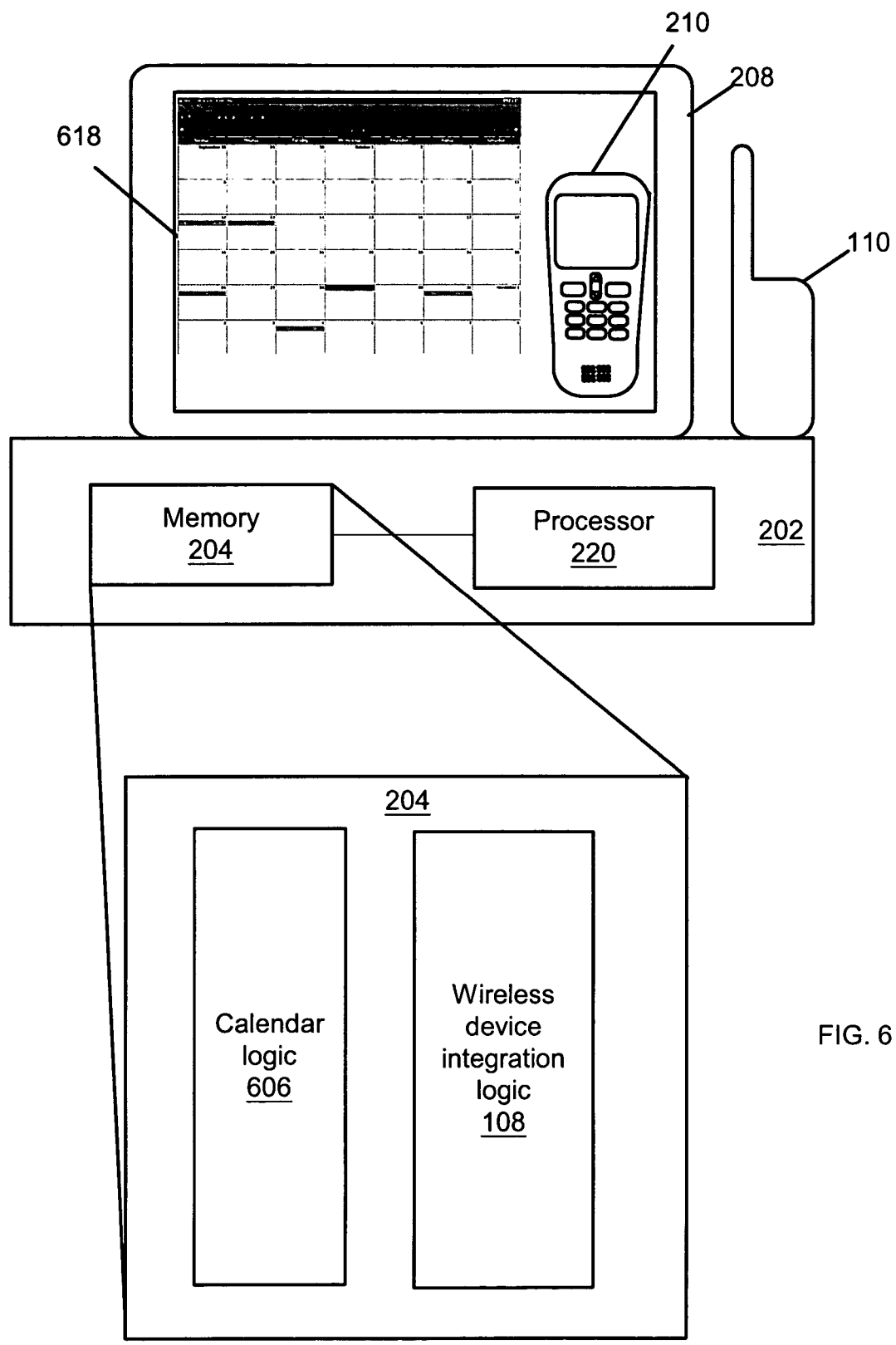
FIG. 6 is a block diagram of an embodiment of an arrangement integrating a wireless device with calendar logic of a computing device.

FIG. 6 is a block diagram of an embodiment of an arrangement integrating a wireless device with calendar logic of a computing device. The logic comprised by the memory 204 includes the wireless device integration logic 108 and calendar logic 606. Applying the calendar logic 606 to the processor 220 results in display of a graphical user interface (GUI) 618. A user of the computing device 202 may interact with the GUI 618 to schedule and manage meetings, events, things to do, and so on.

Figure 7:
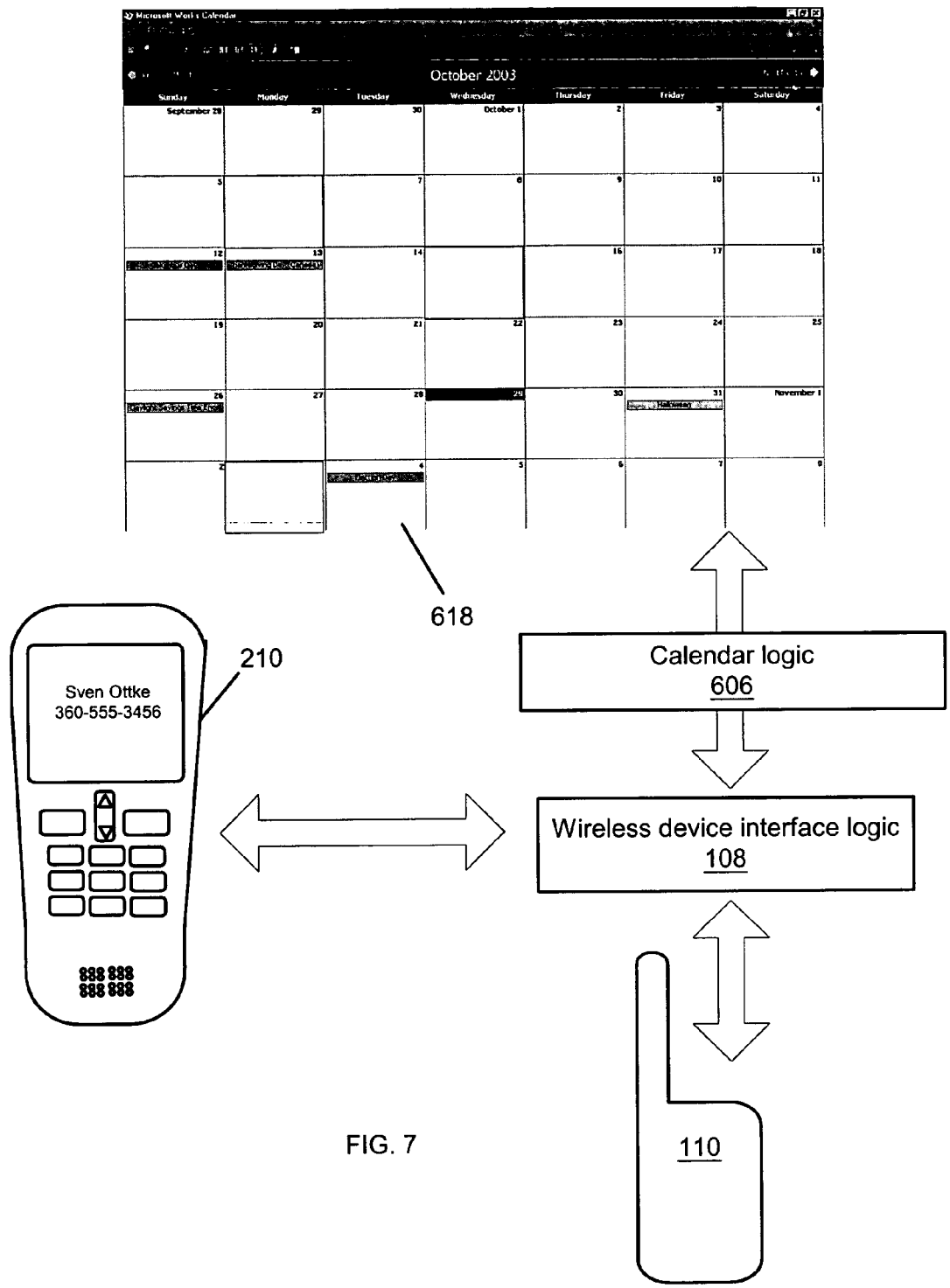
FIG. 7 is another block diagram of an embodiment of an arrangement integrating a wireless device with calendar logic of a computing device.

FIG. 7 is another block diagram of an embodiment of an arrangement integrating a wireless device with calendar logic of a computing device. The logic 108 may interact with the calendar logic 606 to identify activities (meetings, events, to do items, etc.) scheduled with the caller; and to highlight or otherwise call attention to the identified scheduled activities. The logic 108 may interact with the calendar logic 606 to cause a new activity with the caller to be created for scheduling. Information about the caller made available from the wireless device (caller's phone number, name, photo, etc.) may be added to the newly created activity record. For example, a new meeting record may be created with the caller's name listed in the "attendee" field.

The logic 108 may interact with one or more of the calendar logic 606, contact manager logic 206, and email logic 406 to identify information specific to the caller (such as the caller's contact information) and place such information in the body and/or attachments of a new activity record; and to form an email message to the caller with information about the new activity to schedule.

The logic 108 may interact with the calendar logic 606 to cause a new activity with the caller to be created for scheduling; to form an SMS, EMS, or MMS message with information about the activity to schedule and also possibly with contact or other information about the called party; and to wirelessly communicate the SMS, EMS, or MMS message over a connection to the caller.

The logic 108 may interact with the calendar logic 606 and the GUI 210 to enable "drag-and-drop" of caller information displayed by the GUI 210 to the calendar logic 606. "Dropping" the caller information (such as the caller's phone number and/or name) to the calendar logic 606 may cause creation of a new activity record including the caller's name in the "attendee" field of the record; to identify information specific to the caller and place such information in the activity record; and to communicate information about the new activity to the caller via email, SMS, EMS, MMS, or other technique.

The logic 108 may interact with the calendar logic 606 and the GUI 210 to enable "drag-and-drop" of an activity record from the calendar logic 606 to the GUI 210. Information "dropped" from the calendar logic 606 to the GUI 210 may be stored in the memory 106 of the wireless device 110. Information about the activity may be communicated wirelessly to one or more parties identified in the "attendee" fields, via SMS, EMS, MMS, or other technique.

When an incoming call is rejected or not accepted due to busy or no answer, the logic 108 may interact with the calendar logic 606 to schedule an activity and to communicate information about the new activity to the caller via email, SMS, EMS, MMS, or other technique.

If the caller's location information is available from the wireless device 110, driving directions and/or a map may be determined from the caller's location to the called party's location, and may be communicated to the called party via email, SMS, EMS, MMS, or other technique. The computing device 202 and/or wireless device 110 may determine their own locations using Global Positioning System (GPS) technology, signal transmission delay information, default location configuration, Enhanced Observed Time Difference (EOTD) technology, and other methods. Driving directions between two locations may be generated using Internet services such as Mapquest™.

Figure 8:
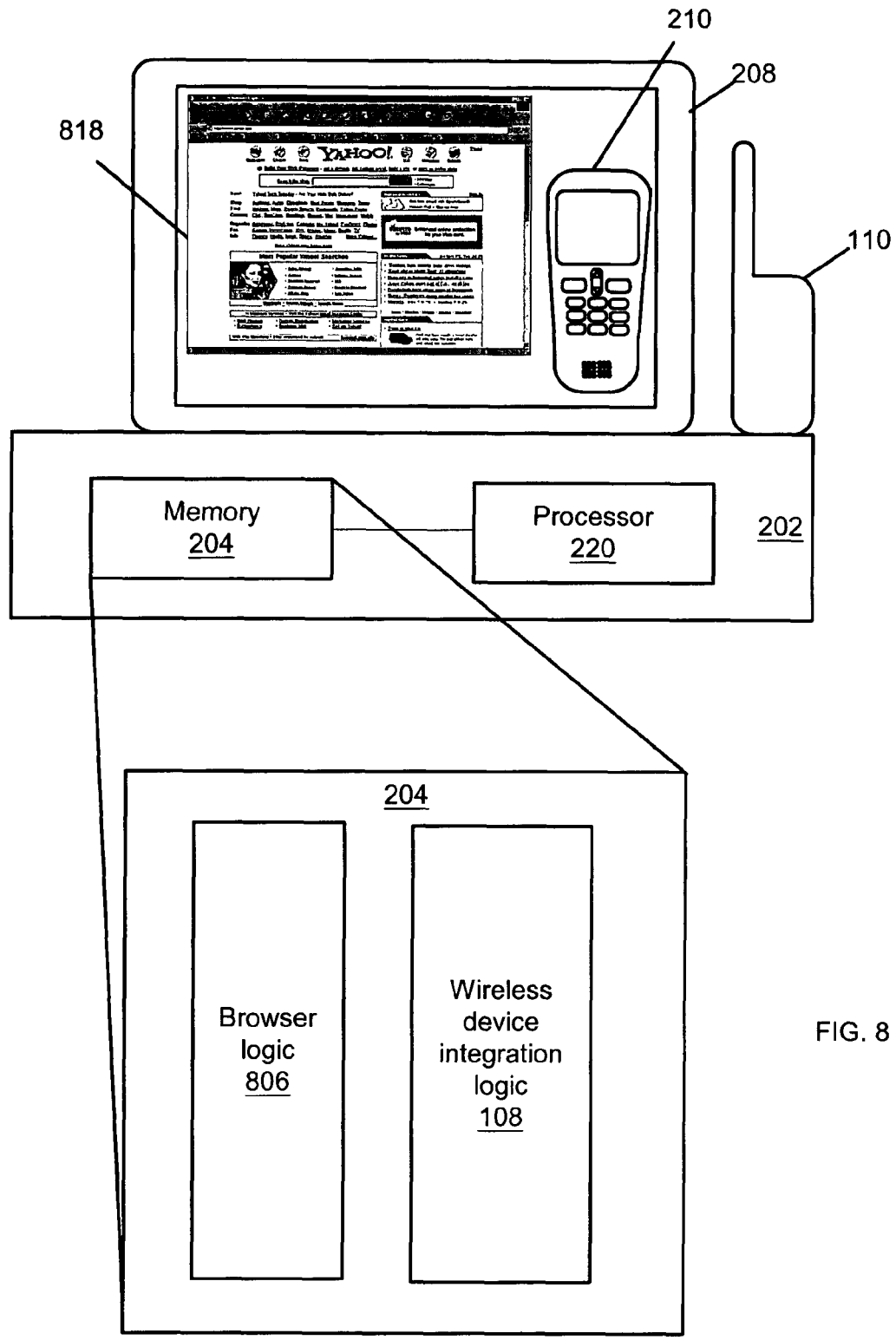
FIG. 8 is a block diagram of an embodiment of an arrangement integrating a wireless device with browser logic of a computing device.

FIG. 8 is a block diagram of an embodiment of an arrangement integrating a wireless device with browser logic of a computing device. The logic comprised by the memory 204 includes the wireless device integration logic 108 and browser logic 806. Applying the browser logic 806 to the processor 220 results in display of a graphical user interface (GUI) 818. A user of the computing device 202 may interact with the GUI 818 to access and interact with logic of a network, such as web pages, Java™, CGI, Perl, ActiveX™, etc., and various communication protocols (IP, HTTP, FTP, HTTPS, etc.).

Figure 9:
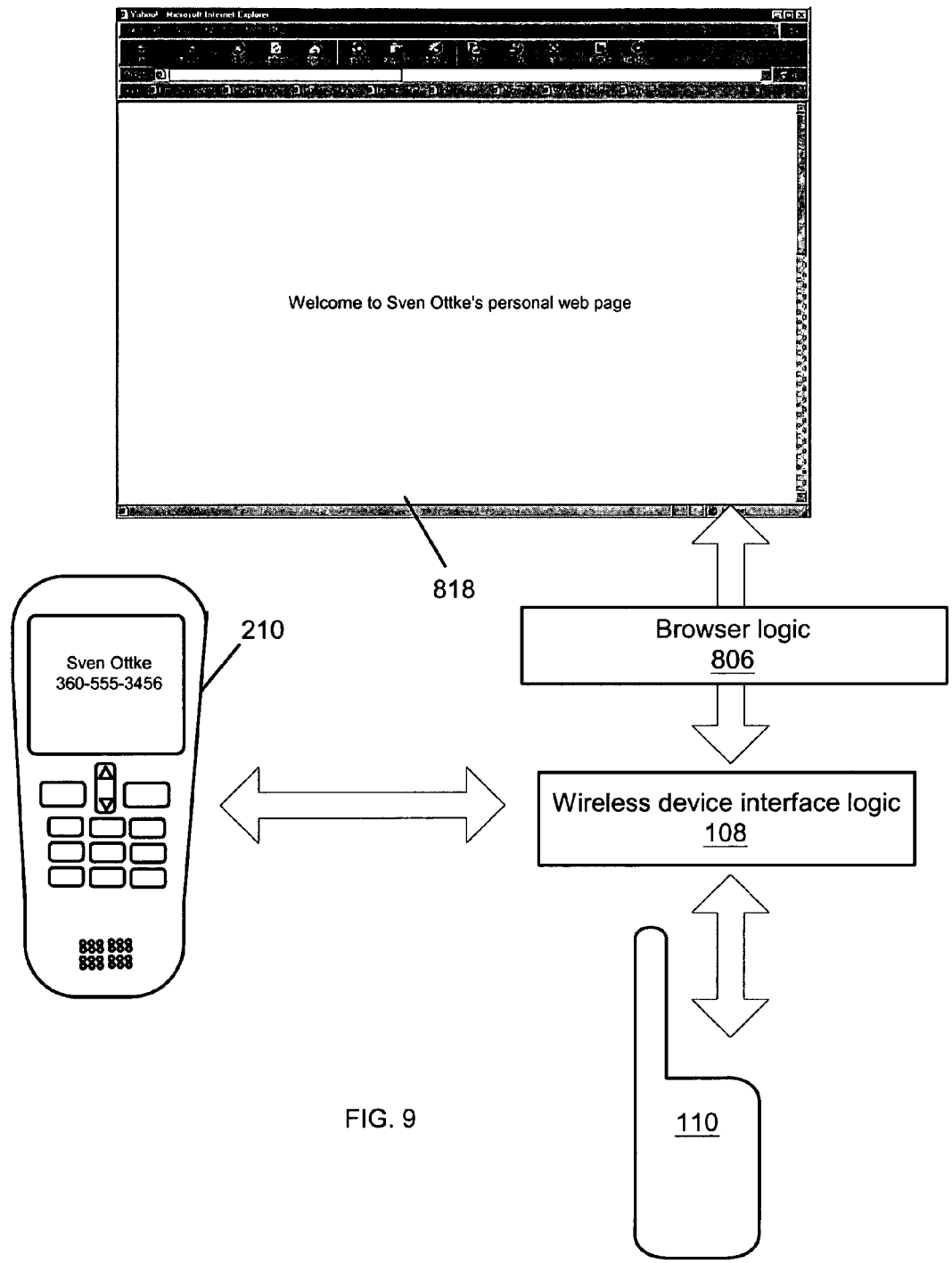
FIG. 9 is another block diagram of an embodiment of an arrangement integrating a wireless device with browser logic of a computing device.

FIG. 9 is another block diagram of an embodiment of an arrangement integrating a wireless device with browser logic of a computing device. The logic 108 may interact with the browser logic 806 to display a web page identified with the call (e.g. the caller's personal web page, a web page identified in an SMS message, etc.).

The logic 108 may interact with the browser logic 806 to perform a web search using the caller's name or other information provided in the call. The web search may be performed by submitting the caller's name or other information from the call (such as the subject of an SMS message) to a web search engine such as Google™. Results of the web search (such as URLs to content associated with the caller) may be communicated to and stored by the wireless device 110.

The logic 108 may interact with the browser logic 806 to communicate bookmarks (stored URLS) from the computing device 202 to the wireless device 110. This may enable a user of the wireless device 202 with browsing capability to enjoy the convenience of using the bookmarks of the browser logic 806. Likewise, the logic 108 may interact with the browser logic 806 to communicate bookmarks (stored URLs) from the wireless device 110 to the computing device 202.

Figure 10:
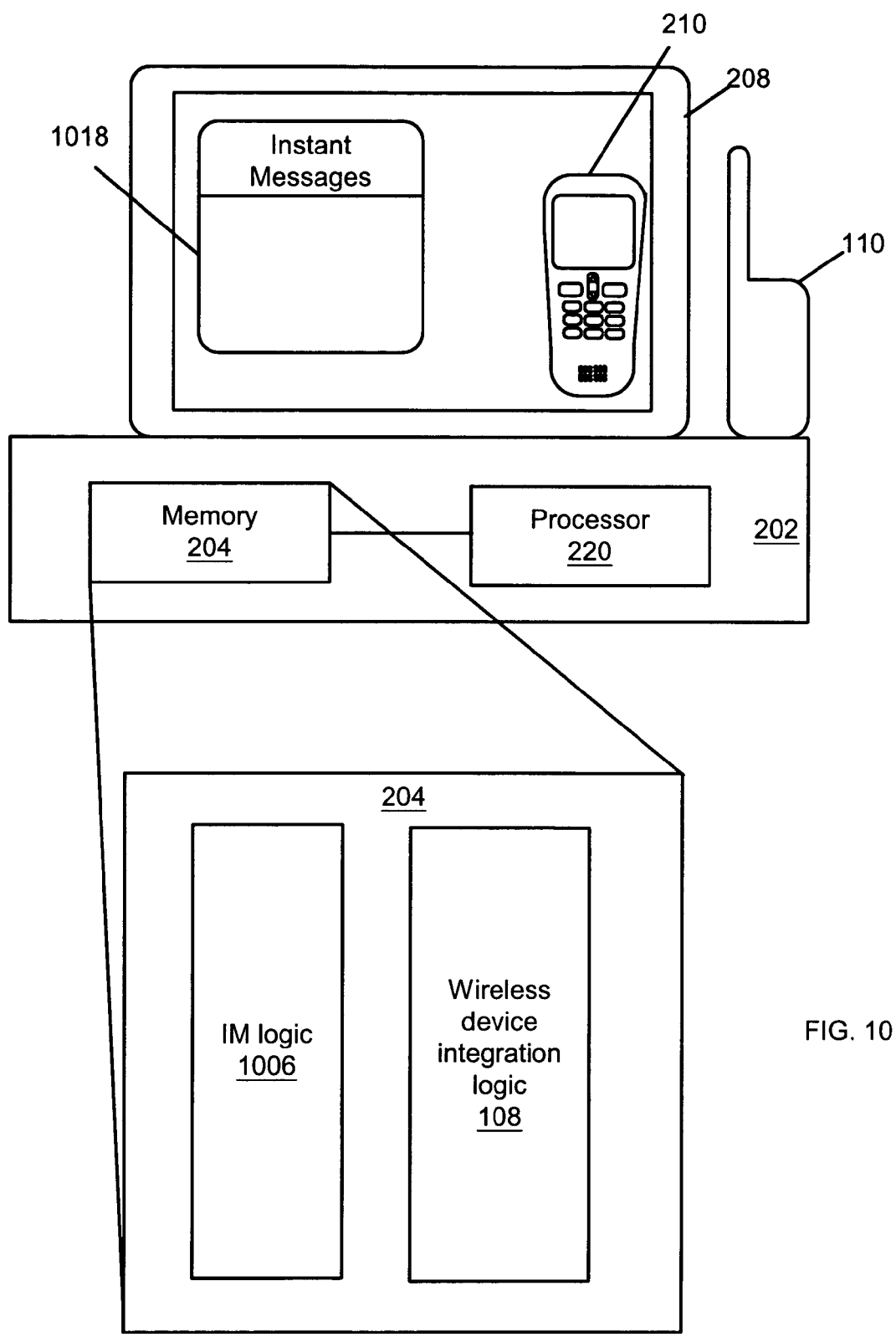
FIG. 10 is a block diagram of an embodiment of an arrangement integrating a wireless device with instant messaging logic of a computing device.

FIG. 10 is a block diagram of an embodiment of an arrangement integrating a wireless device with instant messaging logic of a computing device. The logic comprised by the memory 204 includes the wireless device integration logic 108 and instant messaging logic 1006. Applying the instant messaging logic 1006 to the processor 220 results in display of a graphical user interface (GUI) 1018. A user of the computing device 202 may interact with the GUI 1018 to send and receive instant messages.

Figure 11:
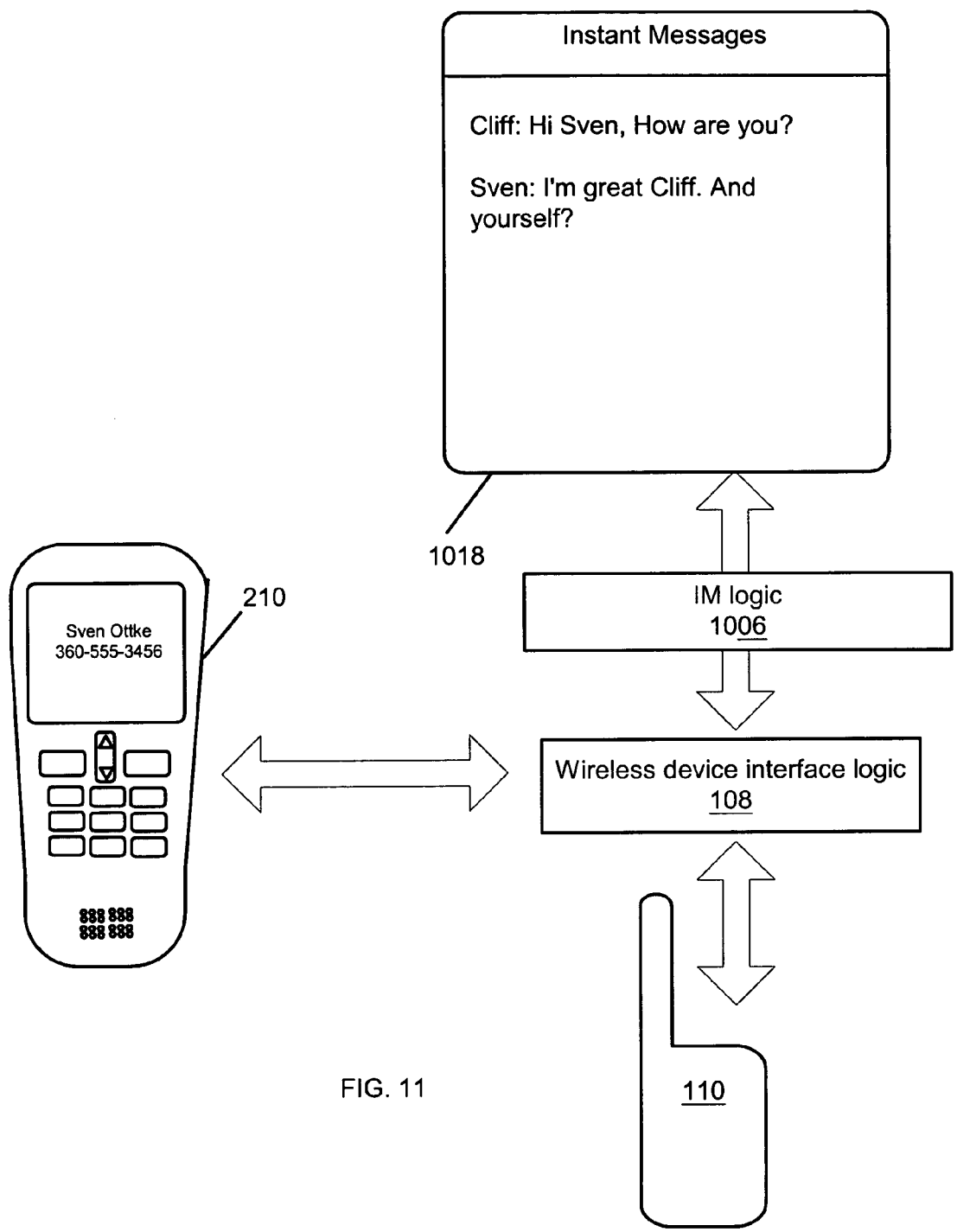
FIG. 11 is another block diagram of an embodiment of an arrangement integrating a wireless device with instant messaging logic of a computing device.

FIG. 11 is another block diagram of an embodiment of an arrangement integrating a wireless device with instant messaging logic of a computing device. The logic 108 may interact with the instant messaging logic 1006 to exchange instant messages via the wireless device 110.

Message information provided to the IM logic 1006 may be communicated to the logic 108, which provides a corresponding SMS, EMS, or MMS message to the wireless device 110.

An SMS, EMS, or MMS message received by the wireless device 110 may be provided to the logic 108, which in turn provides corresponding message information to the IM logic 1006.

Figure 12:
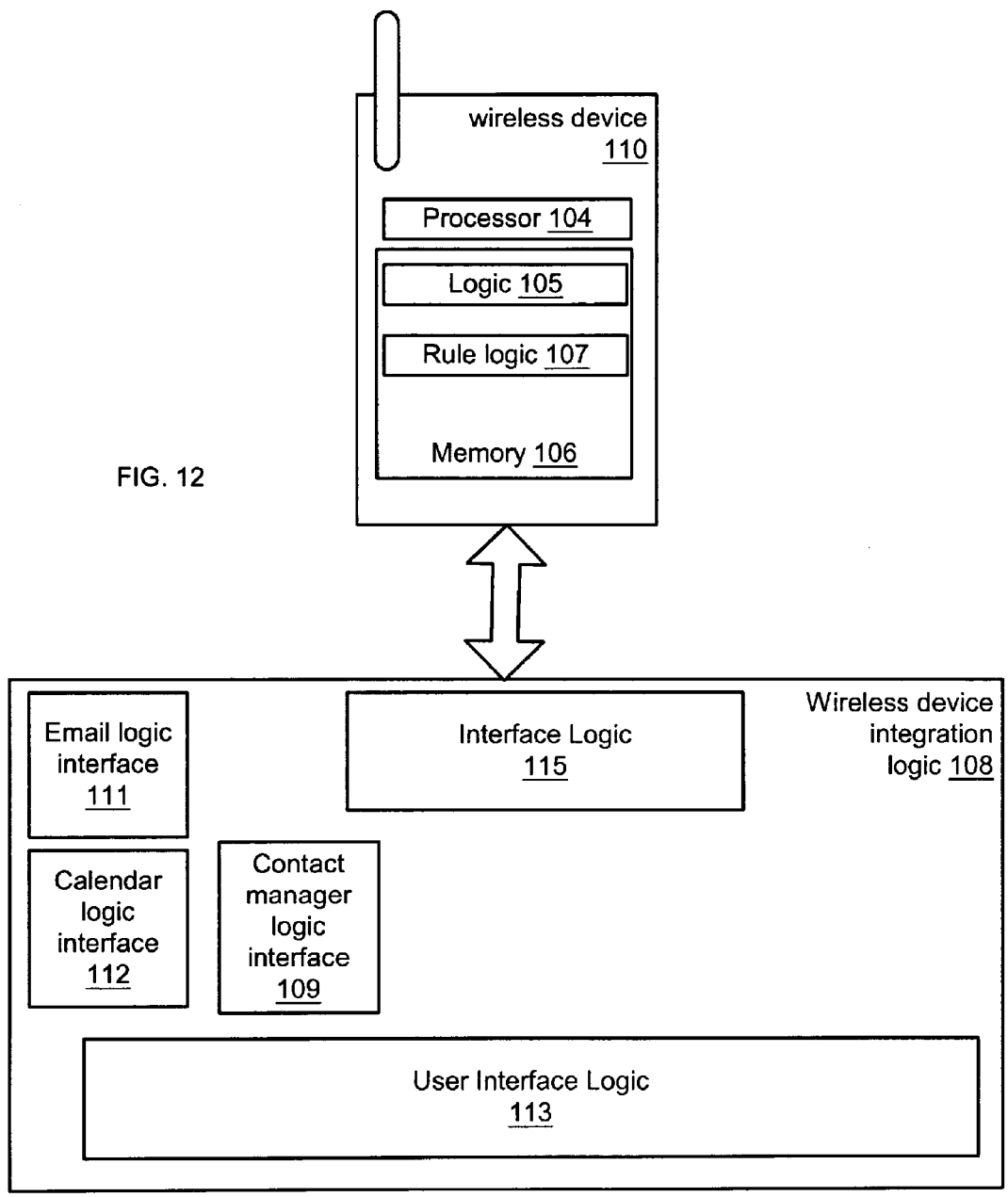
FIG. 12 is a block diagram of another embodiment of an arrangement integrating a wireless device with logic of an external computing device.

FIG. 12 is a block diagram of another embodiment of an arrangement integrating a wireless device with logic of an external computing device. In contrast to FIG. 1, in this embodiment the wireless device comprises the rule logic 107 for handling events and information received from the wireless device 110. Thus the rule logic 107 is conveniently portable with the wireless device 110, which may be shared among several external computing devices.

The wireless device interface logic 108 of the external computing device 202 comprises only generic logic components, e.g. logic components that are not specific to the rules of a particular wireless device.

Configuration of the rules logic 107 of the wireless device 110 may still be effected by the user interface logic 113 of the external computing device 202. The user interface logic 113 may accept signals from a person or other operator of the external computing device 110. The user interface logic 113 may operate according to the signals and interact with the interface logic 115 to effect changes to the rules logic 107. For example, a person may signal the user interface logic 113, via the GUI 210, to change the rules for handling incoming calls, and/or incoming calls from a particular caller. The user interface logic 113 may in turn interact with the interface logic 115 to effect the appropriate changes to the rules logic 107.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method of displaying contact information in real time about a caller, the method comprising:

receiving information from the caller via a wireless device;

communicating the information to at least one computing device external to the wireless device;

locating the contact information for the caller in a contact database of either the external computing device or of a network to which the external computing device belongs, using at least one of a name and phone number of the caller;

displaying the contact information for the caller on a display of the external computing device; and communicating to the caller, via a call logic on the wireless device interacting with a contact manager logic on the wireless device, one of a Short Message Service (SMS), Enhanced Message Service (EMS), and Multimedia Message Service (MMS) message containing a called party's name and photo, the called party being a user of the wireless device receiving a call from the caller.

2. The method of claim 1, further comprising:
if the contact information for the caller is not located, the external computing device creating a new contact record for the caller in the contact database, the new contact record associating the name and phone number of the caller.

3. The method of claim 2, further comprising:
the external computing device receiving photo information for the caller from the wireless device; and
including the photo information in the new contact record for the caller.

4. The method of claim 1, further comprising:
providing contact information from contact manager logic of the external computing device or of the network to which the external computing device belongs to the wireless device; and
communicating the contact information to the wireless device as one of an SMS, EMS, and MMS message.

5. The method of claim 4, further comprising:
dragging the contact information from a GUI for the contact manager logic; and
dropping the contact information into a GUI for wireless device interface logic.

6. The method of claim 1, further comprising:
providing contact information from contact manager logic of the external computing device or of the network to the wireless device; and
storing the contact information from the contact manager logic in a memory of the wireless device.

7. A system comprising:
at least one wireless device;
at least one computing device external to the wireless device;
the wireless device comprising logic to communicate caller name and phone number information to the external computing device in real time during a call with the caller; and
the external computing device comprising logic to locate in real time during the call contact information for the caller in a contact database, using at least one of a name and phone number of the caller, and a call logic to communicate to the caller, via a call logic on the wireless device interacting with a contact manager logic on the wireless device, one of a Short Message Service (SMS), Enhanced Message Service (EMS), and Multimedia Message Service (MMS) message containing a called party's name and photo, the called party being a user of the wireless device receiving a call from the caller.

8. The system of claim 7, further comprising:
the external computing device comprising logic to display the contact information.

9. The system of claim 7, further comprising:
the external computing device comprising logic to create a new contact record for the caller in the contact database if the contact information for the caller is not located in the contact database, the new contact record associating the name and phone number of the caller.

10. The system of claim 9, further comprising:
the external computing device comprising logic to include photo information for the caller received from the wireless device in the new contact record for the caller.

11. The system of claim 7, further comprising:
the external computing device comprising logic to provide contact information from the contact manager database to the wireless device via one or more of an SMS, EMS, and MMS message.

12. The system of claim 11, further comprising:
contact manager logic comprising a GUI; and
logic to enable dragging and dropping of the contact information from the contact manager logic GUI to a GUI for the wireless device displayed by the external computing device.

13. The system of claim 7, further comprising:
the external computing device comprising logic to provide the contact information to the wireless device; and
the wireless device comprising logic to store the contact information received from the external computing device.

14. A device comprising:
logic to interface with at least one wireless device;
logic to in real time during a call receive from the wireless device caller name and phone number information and to locate contact information for the caller in a contact database using at least one of a name and phone number of the caller; and
logic to communicate to the caller, via a call logic on the wireless device interacting with a contact manager logic on the wireless device, one of a Short Message Service (SMS), Enhanced Message Service (EMS), and Multimedia Message Service (MMS) message containing a called party's name and photo, the called party being a user of the wireless device receiving a call from the caller.

15. The device of claim 14, further comprising:
logic to display the contact information.

16. The device of claim 14, further comprising:
logic to create a new contact record for the caller in the contact database if the contact information for the caller is not located in the contact database, the new contact record associating the name and phone number of the caller.

17. The device of claim 16, further comprising:
logic to include photo information for the caller received from the wireless device in the new contact record for the caller.

18. The device of claim 14, further comprising:
logic to provide contact information from the contact manager database to the wireless device via one or more of an SMS, EMS, and MMS message.

19. The device of claim 18, further comprising:
contact manager logic comprising a GUI;
wireless device interface logic comprising a GUI; and
logic to enable dragging and dropping of the contact information from the contact manager logic GUI to the wireless device interface logic GUI.

20. The device of claim 14, further comprising:
logic to provide the contact information to the wireless device.

* * * * *